(12) United States Patent
Sugiyama

(10) Patent No.: US 11,443,266 B2
(45) Date of Patent: Sep. 13, 2022

(54) MACHINE LEARNING METHOD AND MACHINE LEARNING APPARATUS PERFORMING LEARNING RELATING TO WORK PROCESS

(71) Applicant: FANUC CORPORATION, Yamanashi (JP)

(72) Inventor: Yuusuke Sugiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 16/929,107

(22) Filed: Jul. 15, 2020

(65) Prior Publication Data

US 2021/0056488 A1 Feb. 25, 2021

(30) Foreign Application Priority Data

Aug. 19, 2019 (JP) .............................. JP2019-149818

(51) Int. Cl.
| | | |
|---|---|---|
| *G06Q 10/00* | (2012.01) | |
| *G06N 20/00* | (2019.01) | |
| *G06N 3/00* | (2006.01) | |
| *G06Q 10/06* | (2012.01) | |
| *G06N 3/08* | (2006.01) | |

(52) U.S. Cl.
CPC ......... *G06Q 10/06395* (2013.01); *G06N 3/08* (2013.01); *G06N 20/00* (2019.01); *G06Q 10/0631* (2013.01); *G06Q 10/0633* (2013.01)

(58) Field of Classification Search
CPC .......................................... G06Q 10/00–50/00

USPC ................................................ 705/7.11–7.42
See application file for complete search history.

(56) References Cited

U.S. PATENT DOCUMENTS

| | | | | |
|---|---|---|---|---|
| 2018/0336504 | A1* | 11/2018 | Yamane | G06Q 30/0201 |
| 2019/0114937 | A1* | 4/2019 | Capps | G06Q 10/0639 |
| 2020/0074380 | A1* | 3/2020 | Mori | G06Q 10/0633 |
| 2020/0183369 | A1* | 6/2020 | Kumar | G06Q 10/06315 |
| 2020/0320482 | A1* | 10/2020 | Lecue | G06F 17/18 |
| 2021/0012266 | A1* | 1/2021 | Stenning | G06Q 10/06393 |
| 2021/0019215 | A1* | 1/2021 | Neeter | G06N 5/003 |

FOREIGN PATENT DOCUMENTS

| | | |
|---|---|---|
| JP | 2014155207 A | 8/2014 |
| JP | 2017131335 A | 8/2017 |
| JP | 6224873 B1 | 11/2017 |
| WO | 2010143361 A1 | 12/2010 |

* cited by examiner

*Primary Examiner* — Mustafa Iqbal
(74) *Attorney, Agent, or Firm* — Hauptman Ham, LLP

(57) ABSTRACT

A machine learning apparatus totals up all of the unit work operations included in the plurality of different work processes and judges if the plurality of unit work operations of the same type are similar to each other. The machine learning apparatus defines a similar first unit work operation and second unit work operation as a set of similar work operations, uses a common machine learning algorithm so as to generate a similar work learning model, and performs learning relating to a first work process including the first unit work operation and a second work process including the second unit work operation based on the similar work learning model.

12 Claims, 7 Drawing Sheets

MACHINE LEARNING METHOD AND MACHINE LEARNING APPARATUS PERFORMING LEARNING RELATING TO WORK PROCESS

RELATED APPLICATIONS

The present application claims priority to Japanese Application Number 2019-149818, filed Aug. 19, 2019, the disclosure of which is hereby incorporated by reference herein in its entirety.

BACKGROUND OF THE INVENTION

1. Field of the Invention

The present invention relates to a machine learning method and machine learning apparatus performing learning relating to a work process.

2. Description of the Related Art

When a person performs some sort of work process (for example, an assembly process, inspection process, washing process, packaging process, administrative process, etc.), for example, from the viewpoint of work support or quality control, sometimes it is desirable to obtain a grasp of the features of the work process (work content, worker, work time, work date and time, etc.) Based on the obtained features of the work process, for example, it is possible to teach a worker the correct work procedure by video or audio in accordance with need or to analyze causes of process defects.

Japanese Unexamined Patent Publication No. 2014-155207A discloses a head-mounted type display device proposing a current procedure by image recognition of an image of an external scene and displaying a string of text showing contents of instructions or graphics showing matters to be performed by a user.

Japanese Patent No. 6224873B discloses an information processing system displaying graphic instructions relating to correction of work superposed in actual space when a difference of standard data registered for the work and acquired work data is a threshold value or more.

International Publication No. WO 2010/143361A1 discloses a work recognition apparatus using output of a speed sensor and output of an imaging part so as to specify work of a user.

Japanese Unexamined Patent Publication No. 2017-131335A discloses an endoscope washing management system for determining work procedure information provided in accordance with a skill level of a worker.

SUMMARY OF THE INVENTION

By collecting and storing as known information the features of a work process (work content, worker, work time, work date and time, etc.) linked, for example, with conditions required for work support or quality control (condition for teaching work procedure, condition for analyzing causes of process defects, etc.), it is possible to efficiently newly set, correct, change, etc. the conditions. In this case, it is desirable to quickly and accurately collect and store information, improve the reliability of the stored information, etc.

One aspect of the present disclosure is a machine learning method for performing learning relating to a plurality of different work processes respectively including at least single types of unit work operations, the machine learning method comprising totaling up all of the unit work operations included in the plurality of different work processes so as to assess the presence of a plurality of unit work operations of the same type, judging if the plurality of unit work operations of the same type are similar to each other, defining a first unit work operation and a second unit work operation that are similar to each other as a set of similar work operations and using a common machine learning algorithm so as to generate a similar work learning model using features of the set of similar work operations as input data, and performing learning relating to a first work process including the first unit work operation and a second work process including the second unit work operation based on the similar work learning model.

Another aspect of the present disclosure is a machine learning apparatus for performing learning relating to a plurality of different work processes respectively including at least single types of unit work operations, the machine learning apparatus comprising a work totaling part for totaling up all of the unit work operations included in the plurality of different work processes so as to assess the presence of a plurality of unit work operations of the same type, a similarity judging part for judging if the plurality of unit work operations of the same type are similar to each other, a first learning part for defining a first unit work operation and a second unit work operation that are similar to each other as a set of similar work operations and using a common machine learning algorithm so as to generate a similar work learning model using features of the set of similar work operations as input data, and a second learning part for performing learning relating to a first work process including the first unit work operation and a second work process including the second unit work operation based on the similar work learning model.

DETAILED DESCRIPTION

Below, embodiments of the present disclosure will be explained with reference to the attached drawings. Throughout all of the drawings, corresponding component elements are assigned common reference notations.

Figure 1:
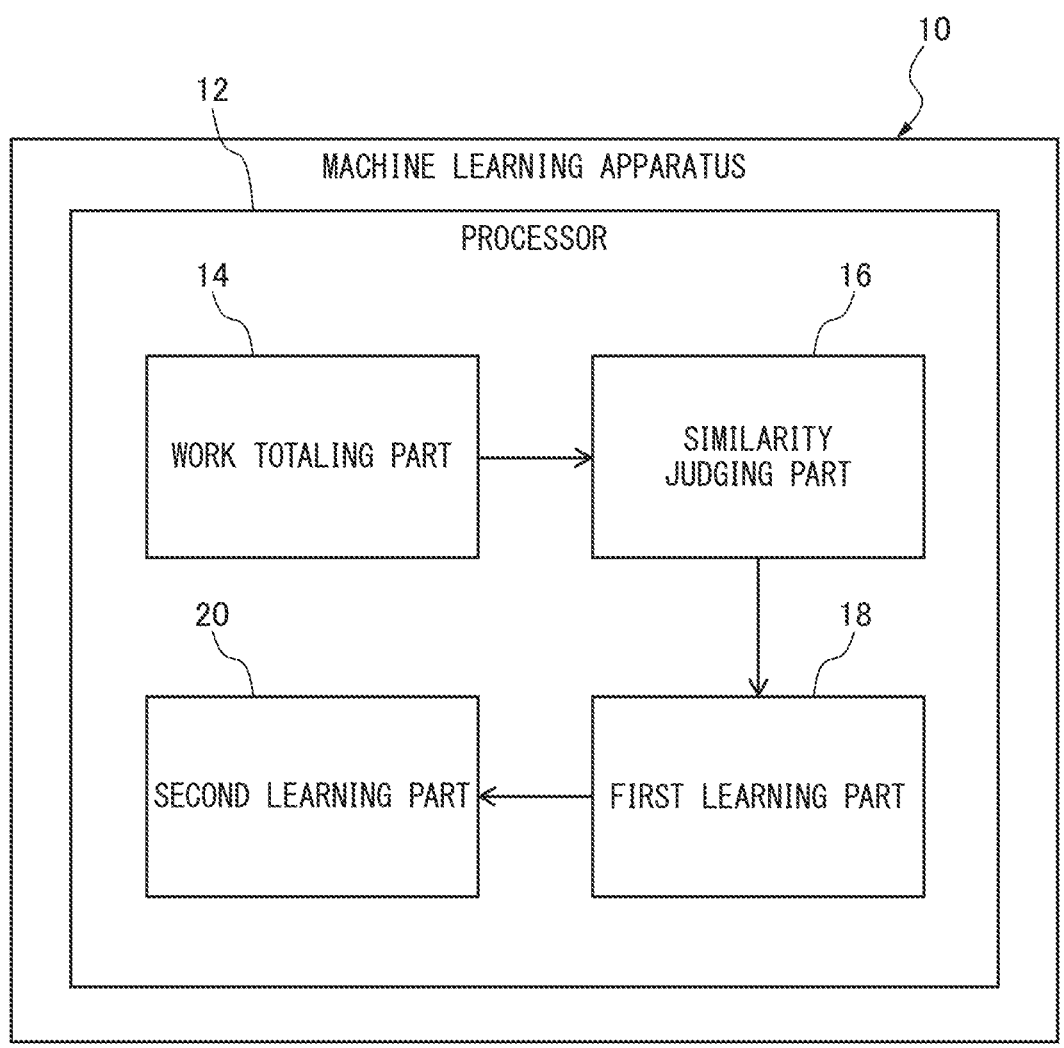
FIG. 1 is a functional block diagram showing a machine learning apparatus according to one embodiment.
Figure 2:
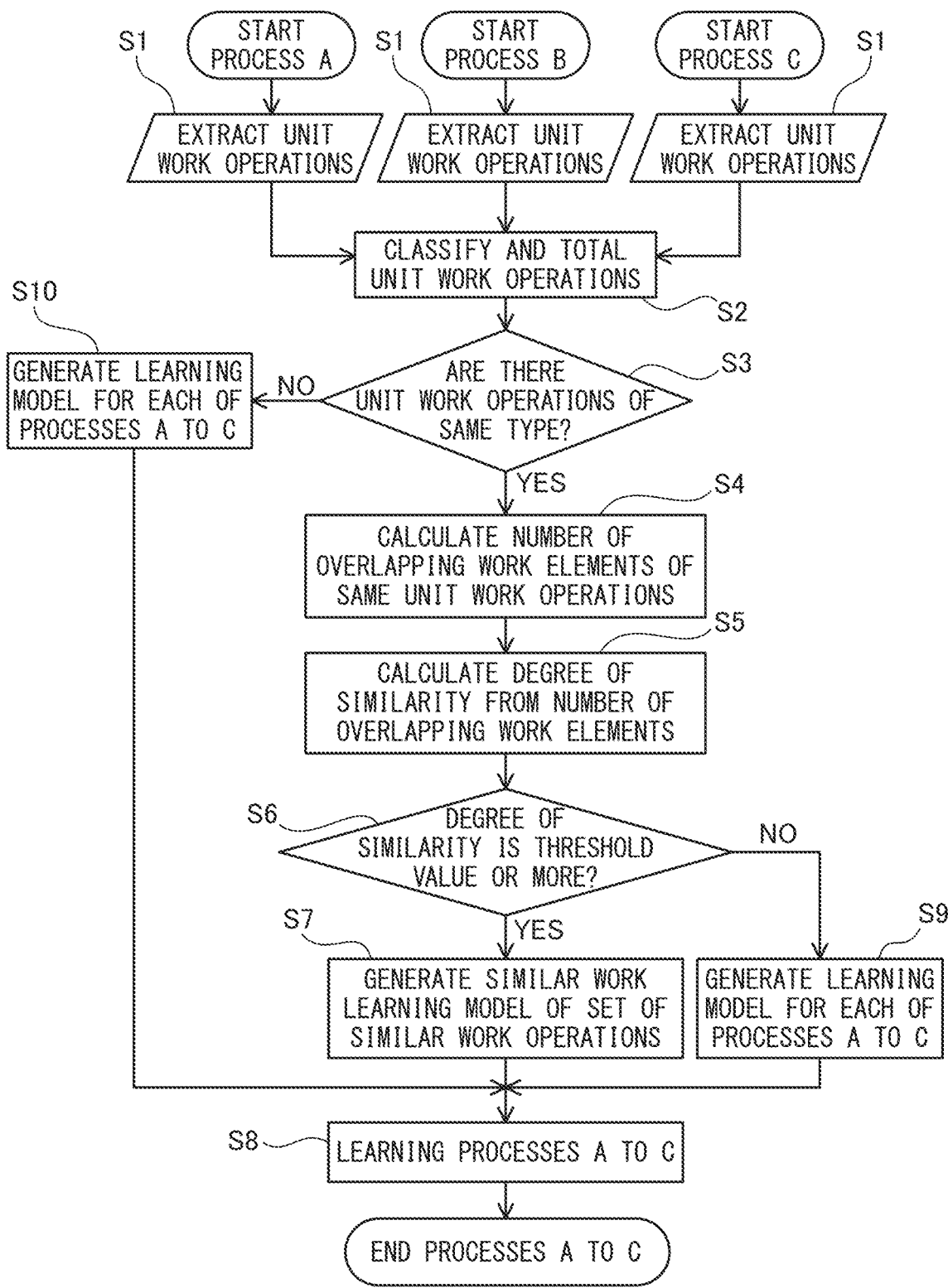
FIG. 2 is a flow chart showing a machine learning method according to one embodiment.

FIG. 1 shows a machine learning apparatus 10 according to one embodiment by functional blocks. FIG. 2 shows a machine learning method according to one embodiment which the machine learning apparatus 10 performs.

The machine learning apparatus 10 learns, by itself by so-called machine learning, various matters relating to the features of a work process (work content, worker, work time, work date and time, etc.) when someone performs some sort of work process (for example, an assembly process, inspection process, washing process, packaging process, administrative process, etc.). It is provided with a processor of a computer (for example, a central processing unit (CPU)) or other hardware for running software which defines various learning algorithms. For example, the machine learning apparatus 10 can learn features of a work process which is linked with conditions which are required for work support or quality control (condition for teaching work procedure, condition for analyzing causes of process defects, etc.). By using a learning model which the machine learning apparatus 10 generates by learning, it is possible to efficiently newly set, correct, change, etc. the above conditions.

As shown in FIG. 1, the machine learning apparatus 10 is provided with a processor 12 which performs learning relating to a plurality of different work processes respectively including at least single types of unit work operations. The processor 12 is provided with a work totaling part 14 for totaling up all of the unit work operations included in the plurality of different work processes so as to assess the presence of a plurality of unit work operations of the same type, a similarity judging part 16 for judging if the plurality of unit work operations of the same type are similar to each other, a first learning part 18 for defining a first unit work operation and a second unit work operation that are similar to each other as a set of similar work operations and using a common machine learning algorithm so as to generate a similar work learning mode using features of the set of similar work operations as input data, and a second learning part 20 for performing learning relating to a first work process including the first unit work operation and a second work process including the second unit work operation based on the similar work learning model. Here, a set of similar work operations can be configured by "n" number (n≥2) of unit work operations (that is, first to n-th unit work operations), the first learning part 18 can generate a similar work learning model by a learning algorithm common for the first to n-th unit work operations, and the second learning part 20 can perform learning relating to the first to n-th work processes respectively including the first to n-th unit work operations based on the similar work learning model.

The processor 12, for example, can be configured by a CPU, ASIC (application specific integrated circuit), FPGA (field programmable gate array), etc. The work totaling part 14, similarity judging part 16, first learning part 18, and second learning part 20 can respectively be configured by single functional blocks of the processor 12 or can be configured as a program for making the processor 12 function or a storage medium (computer readable nonvolatile recording medium). If the work process is for example an assembly process of equipment, as the unit work operations included in the work process, by type, cable attachment work, sheet attachment work, screw attachment work, board attachment work, unit attachment work, clamp work, etc. may be illustrated. If the work process is, for example, an inspection process of an apparatus, as the unit work operations included in the work process, by type, work checking the appearance of the assembled apparatus, work checking the fixed state of the assembled parts, etc. may be illustrated.

The machine learning method which the machine learning apparatus 10 performs, as shown in FIG. 2, performs learning relating to a plurality of different work processes respectively including at least one type of unit work operations. It performs a step of totaling up all of the unit work operations included in the plurality of different work processes so as to assess the presence of a plurality of unit work operations of the same type (steps S1 to S3: operation of work totaling part 14), a step of judging if the plurality of unit work operations of the same type are similar to each other (steps S4 to S6: operation of similarity judging part 16), a step of defining a similar first unit work operation and second unit work operation as a set of similar work operations and using a common machine learning algorithm so as to generate a similar work learning model using features of the set of similar work operations as input data (step S7: operation of first learning part 18), and a step of performing learning relating to a first work process including the first unit work operation and a second work process including the second unit work operation based on the similar work learning model (step S8: operation of second learning part 20).

Figure 3:
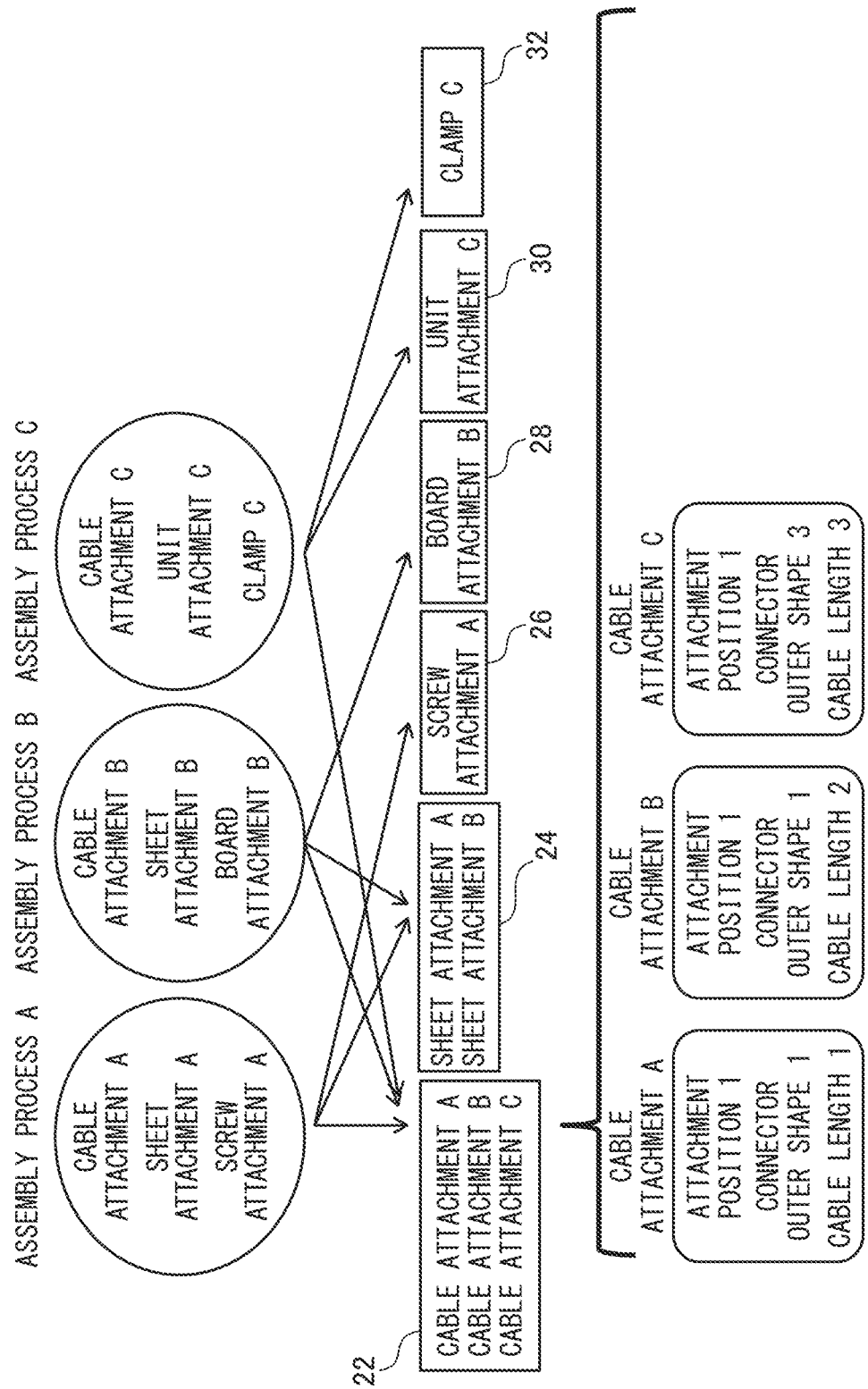
FIG. 3 is a view schematically showing a specific example of the machine learning method of FIG. 2.

FIG. 3 schematically shows one specific example of the machine learning method which the machine learning apparatus 10 performs. Below, referring to FIG. 1, FIG. 2, and FIG. 3, the configurations of the machine learning apparatus 10 and machine learning method will be explained in detail based on specific examples. In the specific example of FIG. 3, the work process is an assembly process of equipment. The machine learning apparatus 10 learns three different assembly processes A to C. The assembly process A includes three types of unit work operations of cable attachment A, sheet attachment A, and screw attachment A. The assembly process B includes three types of unit work operations of cable attachment B, sheet attachment B, and board attachment B. The assembly process C includes three types of unit work operations of cable attachment C, unit attachment C, and clamp attachment C.

As shown in FIG. 2, learning is started by the individual assembly processes A to C being started by any worker at any date and time in any work environment. First, at step S1, the work totaling part 14 extracts all of the unit work operations included in the three assembly processes A to C. As one example of the extraction technique, the technique of using a camera or bar code reader or other feature identifying apparatus provided in the work environment (that is, learning environment) so as to identify the features of the assembly processes A to C can be employed. For example, by using a camera to capture an initial unit work operation of each assembly process or using a bar code reader to read a bar code of an initial workpiece of each assembly process, it is possible to extract a series of unit work operations including the initial unit work operations by reference to a database prepared in advance.

Next, at step S2, the work totaling part 14 classifies all of the extracted unit work operations by type so as to define a plurality of work types. In the specific example of FIG. 3, all of the unit work operations are classified into the work type 22 of the same type of cable attachment A to C, the work type 24 of the same type of sheet attachment A and B, the work type 26 of only screw attachment A, the work type 28 of only board attachment B, the work type 30 of only unit attachment C, and the work type 32 of only the clamp C.

Next, at step S3, the work totaling part 14 judges if there are a plurality of unit work operations of the same type in all of the unit work operations, specifically, if there is a work type including a plurality of unit work operations in the plurality of work types 22 to 32 defined at step S2, and assesses the presence of the same type of unit work operations by this judgment. In the specific example of FIG. 3, due to the presence of the work types 22 and 24 including pluralities of unit work operations, it is assessed that there are the same types of unit work operations.

If there are unit work operations of the same type (when judgment at step S3 is YES), the similarity judging part 16 judges at step S4 to S6 if these unit work operations of the same type are similar to each other. In the specific example of FIG. 3, it is judged if the cable attachment A to C which fall in the work type 22 are similar to each other and if the sheet attachment A and B which fall in the work type 24 are similar to each other.

In order to judge similarity of unit work operations, it is effective to assess the commonality of the work elements which form the unit work operations. The "work elements" mean the individual matters of the plurality of set matters which are required for a person to perform the unit work operations. For example, if the unit work operations are cable attachment work, as the work elements, the attachment position of the cable, the shape of the cable connector, the length of the cable, etc. can be illustrated. Further, when the unit work operations are sheet attachment work, as the work elements, the attachment position of the sheet material, the dimensions and shape of the sheet material, the positions of the assembly holes provided in the sheet material, etc. can be illustrated. In the specific example of FIG. 3, in the work type 22, as the work elements of the cable attachment A, the attachment position 1, the connector outer shape 1, and the cable length 1 are shown, as the work elements of the cable attachment B, the attachment position 1, the connector outer shape 1, and the cable length 2 are shown, and as the work elements of the cable attachment C, the attachment position 1, the connector outer shape 3, and the cable length 3 are shown (numerals 1 to 3 represent differences in settings).

The similarity judging part 16, as one example of the processing for judgment of similarity at steps S4 to S6, can judge if a plurality of unit work operations are similar to each other based on the number of work elements in common in these unit work operations among the work elements forming the plurality of unit work operations of the same type. First, at step S4, the similarity judging part 16 extracts all of the work elements forming the unit work operations of the same types and calculates the numbers of work elements in common among these unit work operations (numbers of overlapping work elements). As the extraction technique, for example, the above-mentioned technique of using a camera or bar code reader or another feature identifying apparatus can be employed. In the specific example of FIG. 3, in the work type 22, the attachment position 1, connector outer shape 1, and cable length 1 of the cable attachment A, the attachment position 1, connector outer shape 1, and cable length 2 of the cable attachment B, and the attachment position 1, connector outer shape 3, and cable length 3 of the cable attachment C are extracted. Between the cable attachment A and the cable attachment B, the attachment position 1 and the connector outer shape 1 are in common, so the number of overlapping work elements of the cable attachments A and B is calculated as "2". Similarly, the number of overlapping work elements of the cable attachments B and C is calculated as "1" and the number of overlapping work elements of the cable attachments C and A is calculated as "1".

Next, at step S5, based on the number of overlapping work elements, the similarity between unit work operations of the same type is, for example, calculated in accordance with the following Formula 1. Formula 1 corresponds to a function for converting the above number of overlapping work elements to a value An considering the weights of the individual work elements (that is, similarity):

$$An = X \cdot x + Y \cdot y + Z \cdot z + \ldots \qquad \text{[Formula 1]}$$

In Formula 1, X, Y, Z, and the variables after Z respectively show work elements forming unit work operations (settings not considered). The work elements common among unit work operations of the same type are given the same arguments meaning "common", while work elements which are not common are given zero as arguments. x, y, z, and the variables after z respectively show the weights of work elements. For example, these are set in accordance with a rule of thumb of the designer of the machine learning apparatus 10. In the specific example of FIG. 3, X represents the attachment position, Y represents the connector outer shape, and Z represents the cable length. The similarity of cable attachments A and B of the number of overlapping work elements "2" is calculated as $An = X \cdot x + Y \cdot y$ considering the respective weights of the attachment position 1 and the connector outer shape 1. Similarly, the similarity of the cable attachments B and C of the number of overlapping work elements "1" is calculated as $An = X \cdot x$ while the similarity of the cable attachments C and A of the number of overlapping work elements "1" is calculated as $An = X \cdot x$.

Next, at step S6, it is judged if the similarity An is a predetermined threshold value or more. The threshold value is a value which becomes the criteria for judgment as to if unit work operations of the same type are similar and is set in accordance with the type of the unit work operations etc., for example, the rule of thumb of the designer of the machine learning apparatus 10 etc. In the specific example of FIG. 3, the threshold value of the similarity An of cable attachment work is set to a value larger than $X \cdot x$ and smaller than $(X \cdot x + Y \cdot y)$. As a result, in the work type 22, it is judged that the cable attachment A and cable attachment B are similar. Here, in the same way, in the work type 24, it is judged that the sheet attachment A and sheet attachment B are similar.

If the plurality of unit work operations of the same type are similar (when judgment at step S6 is YES), at step S7, the first learning part 18 groups mutually similar unit work operations as a set of similar work operations and generates a similar work learning model which uses features of the set of similar work operations (that is, the individual features of the plurality of unit work operations included in the set of similar work operations) as input data by a common machine learning algorithm. In the specific example of FIG. 3, the cable attachment A and the cable attachment B are treated as a set of similar work operations and a single (that is, common to the sheet attachments A and B) similar work learning model which uses features of cable attachment A (work content, worker, work time, work date and time, etc.) and features of cable attachment B (work content, worker, work time, work date and time, etc.) as input data is generated. Common similar work learning models are generated in the same way for the sheet attachment A and B.

If there are unit work operations not similar to other unit work operations among unit work operations of the same type falling in each of the plurality of work types, at step S7 the first learning part 18 individually applies machine learning algorithms to the not similar unit work operations and generates dissimilar work learning models which use the features of the dissimilar unit work operations as input data. The machine learning algorithms for generating the dissimilar work learning models may be the same as or different from the machine learning algorithms for generating the similar work learning models. In the specific example of FIG. 3, in the work type 22, the cable attachment C is a unit work operation not similar to other unit work operations, so a dissimilar work learning model which uses features of cable attachment C (work content, worker, work time, work date and time, etc.) as input data is generated. On the other hand, for the work type 24, there are no unit work operations not similar to other unit work operations, so no dissimilar work learning model is generated.

At step S7, further, in the same way as the above, processing for unit work operations not similar to other unit work operations is performed for work types including only single unit work operations so as to generate dissimilar work learning models. In a specific example of FIG. 3, a dissimilar work learning model is generated for each of the screw attachment A falling in the work type 26, the board attachment B falling in the work type 28, the unit attachment C falling in the work type 30, and the clamp C falling in the work type 32.

If similar work learning models or dissimilar work learning models are generated for all of the unit work operations extracted at step S4, at step S8, the second learning part 20 performs learning relating to the plurality of different work processes (assembly processes A to C) based on the similar work learning models and dissimilar work learning models (based on at least the similar work learning models). Performing learning relating to the work processes is substantially synonymous with generating similar work learning models or dissimilar work learning models for the individual unit work operations included in the work processes, but the second learning part 20 suitably picks and selects the similar work learning models or dissimilar work learning models (at least the similar work learning models) which the first learning part 18 generates for the unit work operations and proceeds with the learning for the work processes. Therefore, learning of the work processes by the second learning part 20 is ended by the similar work learning models or dissimilar work learning models (that is, reliability of correlation of input and output) for the individual unit work operations reaching desired levels of reliability.

In the specific example of FIG. 3, learning relating to the assembly process A is performed based on the similar work learning model which is generated for the cable attachment A, the similar work learning model which is generated for the sheet attachment A, and the dissimilar work learning model which is generated for the screw attachment A. Further, learning relating to the assembly process B is performed based on the similar work learning model which is generated for the cable attachment B, the similar work learning model which is generated for the sheet attachment B, and the dissimilar work learning model which is generated for the board attachment B. Further, learning relating to the assembly process C is performed based on the dissimilar work learning model which is generated for the cable attachment C, the dissimilar work learning model which generated for the unit attachment C, and the dissimilar work learning model which is generated for the clamp C.

When none of the plurality of unit work operations of the same type are similar to each other (when judgment at step S6 is NO), at step S9, the second learning part 20 individually applies machine learning algorithms to the plurality of different work processes (assembly processes A to C) and generates learning models which use features of the individual work processes as input data. The machine learning algorithm for generating a learning model for each work process may be the same as or different from a machine learning algorithm for generating a similar work learning model. Further, the learning model of each work process may be a single learning model which is generated through the work process in question as a whole or may be a combination of a plurality of dissimilar work learning models which the first learning part 18 generates for each of the unit work operations included in the work process. Learning relating to the work processes is ended by the learning models regarding individual work processes (that is, reliability of correlation of input and output) reaching a desired level of reliability.

Further, when all of the unit work operations included in the plurality of different work processes are mutually different types (when judgment at step S3 is NO), at step S10, the second learning part 20 individually applies machine learning algorithms to the plurality of different work processes (assembly processes A to C) and generates learning models which use the features of the individual work processes as input data. The machine learning algorithm for generating the learning model for each work process may be the same as or different from the machine learning algorithm for generating the similar work learning models. Learning relating to the work processes is ended by the learning models regarding individual work processes (that is, reliability of correlation of input and output) reaching a desired level of reliability.

In this way, learning is performed relating to the plurality of different work processes (assembly processes A to C). The work process for learning is ended at the stage where the reliability of the learning models relating to the work processes (similar work learning models and dissimilar work learning models) deepens to the desired level.

As explained above, in the machine learning apparatus 10 and machine learning method according to one embodiment, learning relating to the plurality of different work processes is performed by generating a similar work learning model common to mutually similar unit work operations among the unit work operations included in the individual work processes. The input data of the similar work learning model is data relating to the features of the set of similar work operations (that is, individual features of the plurality of unit work operations included in the set of similar work operations). Compared with a configuration performing learning individually for a plurality of work processes (or plurality of unit work operations), the number of data (that is, number of times of learning) increases. Therefore, a similar work learning model for similar unit work operations is improved in reliability. Along with this, the precision and reliability of learning relating to individual work processes are improved.

For example, in an application collecting and storing features of a work process (work content, worker, work time, work date and time, etc.) as known information linked with conditions required for work support or quality control (condition for teaching work procedure, condition for analyzing causes of process defects, etc.), according to the machine learning apparatus 10 and machine learning method according to one embodiment, not only is it possible to quickly and accurately collect and store such information and generate learning models, but also it is possible to improve the reliability of the stored information, that is, learning models. As a result, it becomes possible to newly set, correct, change, or otherwise process the conditions necessary for work support or quality control with a high efficiency and high precision.

In the machine learning apparatus 10 and machine learning method having the above configuration, the learning technique (machine learning algorithm) which the first learning part 18 performs is not particularly limited. For example, supervised learning, unsupervised learning, reinforcement learning, or another learning technique known as machine learning can be employed. In supervised learning, a large amount of known learning data sets of input data and corresponding output data (in general, called "training data" or "labels" etc.) are provided in advance. It is a technique which identifies, from these known learning data sets, features implying correlation with input data and output data so as to generate a correlation model for estimating the required output with respect to new input (in the machine learning apparatus 10, a similar work learning model). As opposed to this, in unsupervised learning and reinforcement learning, learning is started from a state where the relationship with the input and output is unknown.

Figure 4:
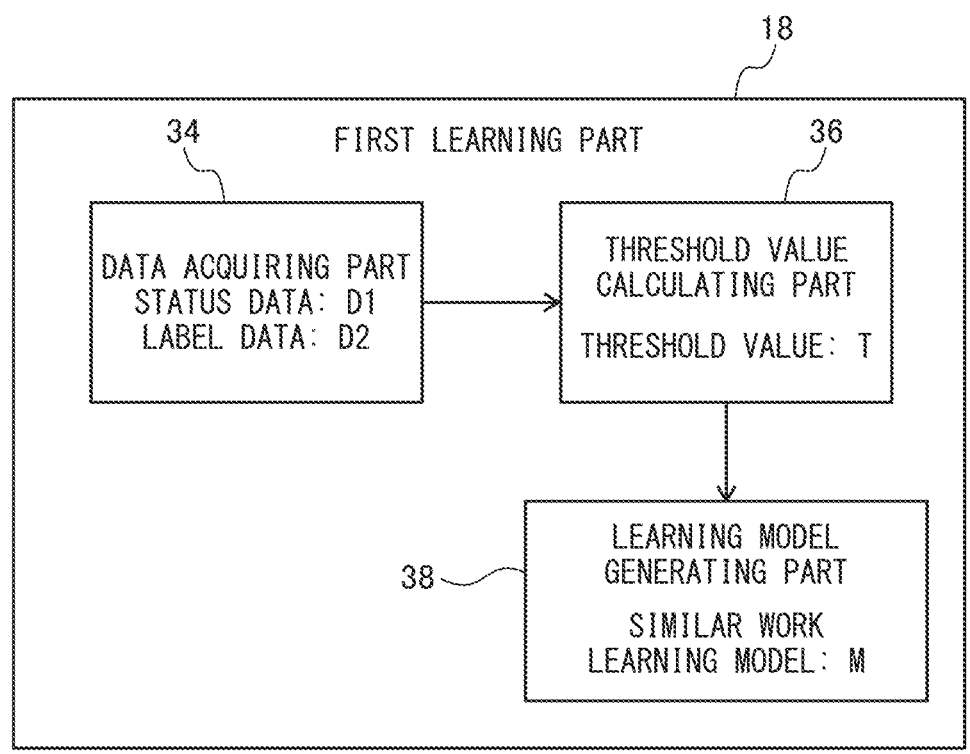
FIG. 4 is a functional block diagram showing one example of a learning part which is provided by the machine learning apparatus of FIG. 1.
Figure 5:
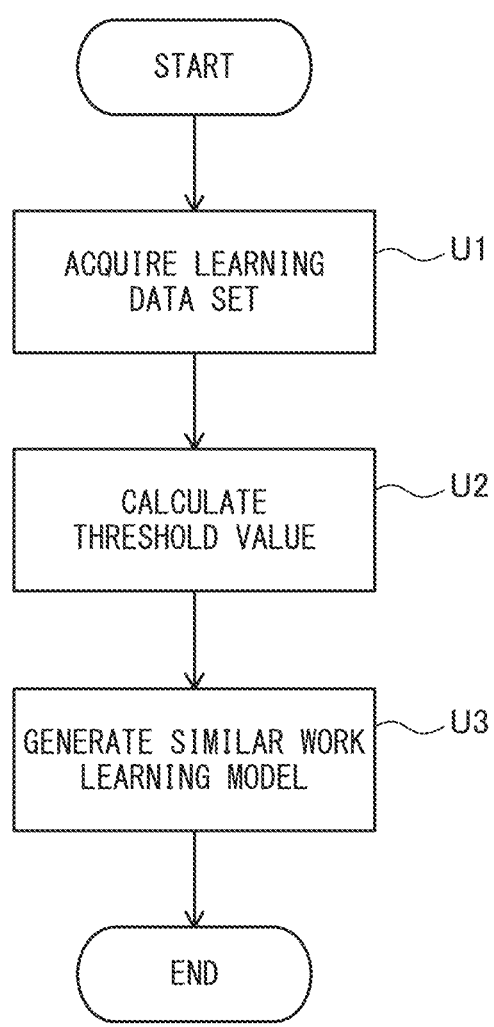
FIG. 5 is a flow chart showing one example of a machine learning algorithm which is applied by the learning part of FIG. 4.

One example of a machine learning algorithm which the first learning part 18 applies in the machine learning apparatus 10 (that is, processing for generating similar work learning model) will be explained with reference to FIG. 4 and FIG. 5. FIG. 4 shows the configuration of the first learning part 18 by functional blocks. FIG. 5 shows a machine learning algorithm which the first learning part 18 performs.

The first learning part 18 is provided with a data acquiring part 34 which acquires, as a learning data set DS, status data D1 including content information of unit work operations which shows features of the unit work operations and label data D2 showing whether the actions of unit work operations corresponding to status data D1 are abnormal, a threshold value calculating part 36 calculating a threshold value T for judging if the actions of unit work operations are susceptible to abnormality based on the learning data set DS, and a learning model generating part 38 using the learning data set DS and generating a similar work learning model M representing correlation between the content information (status data D1) and threshold value T.

The machine learning algorithm which the first learning part 18 performs corresponds to the above-mentioned supervised learning and has a step U1 for acquiring status data D1 and label data D2 as a learning data set DS (operation of data acquiring part 34), a step U2 for calculating a threshold value T based on the learning data set DS (operation of threshold value calculating part 36), and a step U3 for using the learning data set DS so as to generate a similar work learning model M (operation of learning model generating part 38).

Figure 6:
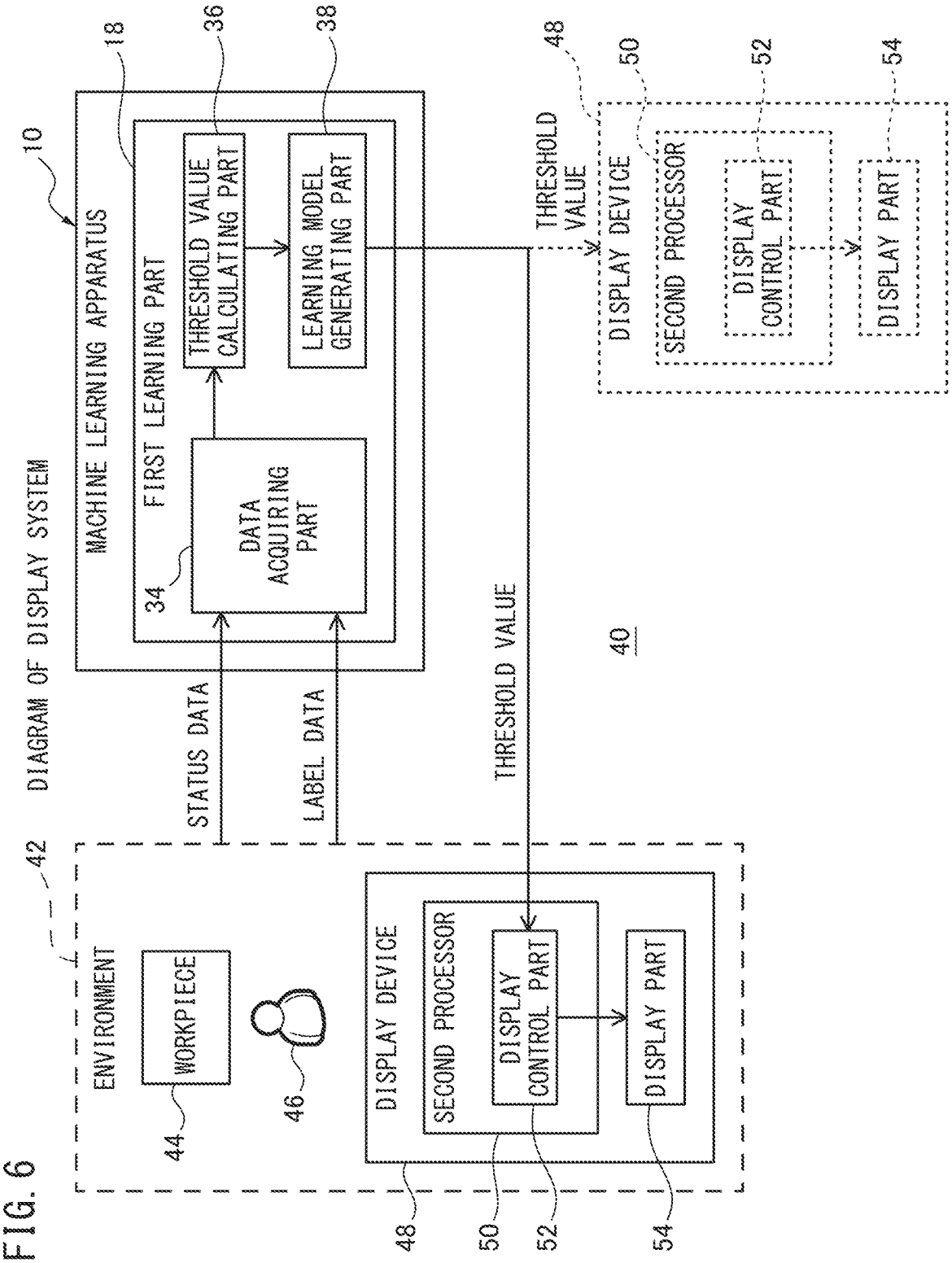
FIG. 6 is a functional block diagram showing a display system which is equipped with a machine learning apparatus of the learning part of FIG. 4.

FIG. 6 shows the configuration of the display system 40 by functional blocks as a specific example of application of a machine learning apparatus 10 having the first learning part 18 shown in FIG. 4. Below, referring to FIG. 6, based on the specific example, the configuration of a machine learning algorithm which the first learning part 18 performs will be explained in detail. As shown in FIG. 6, the display system 40 includes an environment 42 in which the above-mentioned work process is performed, a workpiece 44 which is placed in that environment 42, and a worker 46 for performing a predetermined work process on the workpiece 44. The display system 40 has the function of displaying information which supports a work process to the worker 46.

The display system 40 is provided with a machine learning apparatus 10 and display device 48. The machine learning apparatus 10 and the display device 48 are connected to be able to communicate with each other through a wired or wireless network etc. The machine learning apparatus 10 is configured as a PC (personal computer) and server etc. The display device 48 is configured as a laptop, PDA (personal digital assistant), smartphone, wearable device, etc. placed in the environment 42. The display system 40 may be provided with a plurality of display devices 48. In this case, each of the display devices 48 is arranged in the same environment or separate environments.

The display system 40 has a first learning part 18 of the machining learning apparatus 10 as a first processor and a second processor 50 of the display device 48. The second processor 50 has a display controller 52. The display controller 52 controls the timing for displaying normal work information at the display part 54 of the display device 48 based on the threshold value T which the threshold value calculating part 36 of the first learning part 18 calculates. The second processor 50 further can have the function of judging if the workpiece 44 is a normal piece, the function of displaying a defective location of the workpiece 44 and instructing replacement, and the function of judging if unit work operations were normal.

The "normal work information" may be a normal work procedure relating to the unit work operation or a normal work result. The display part 54 is configured as a liquid crystal display or touch panel display or other known display. The display part 54 displays work support information in accordance with the instructions of the display controller 52 and in particular displays normal work information in accordance with the display timing which the display controller 52 controls. The display part 54 may be configured as an augmented reality device. In this case, normal work information can be displayed overlaid on an image of a real space.

The data acquiring part 34 of the first learning part 18 acquires the status data D1 and label data D2 as the learning data set DS from the environment 42. The status data D1 can further include, in addition to the content information of unit work operations, at least one additional information in the worker information, work time information, and work date and time information of the unit work operations. In this case, the similar work learning model M which the learning model generating part 38 of the first learning part 18 generates represents the correlation of the content information and additional information with the threshold value T.

The "content information" is defined as information which shows what kind of unit work operation the worker 46 has performed in the environment 42 on the workpiece 44. For example, the content information includes a work type code and degree of work difficulty etc. The content information is, for example, determined using a camera or bar code reader or other feature recognition device. The feature recognition device may be provided at the display device 48 or may be provided separately. The content information, for example, may be determined based on an ID or image of the workpiece 44. For example, in the case of assembly work for assembling a plurality of parts together, IDs of individual parts may be compared against reference data stored in advance so as to determine the content information. Further, the content information can be used for judgment as to if the work is normal. The content of a unit work operation has a direct relation with the work result or need for work support etc., so the status data D1 includes at least content information.

The "worker information" is defined as information which shows the degree of skill of the worker 46. For example, the worker information includes a worker ID, age, number of years of employment, number of years of work, etc. The worker information, for example, is determined based on the ID of the worker 46 which is input when verifying authority to enter or exit the environment 42 or authority to access the display device 48. Sometimes a relation is found between the degree of skill of the worker 46 and work result or the need for work support etc.

The "work time information" is defined as information which shows the time which is taken from the start to end of a unit work operation. The work time information is, for example, determined using a camera or bar code reader or other feature recognition device. Alternatively, the work time information is determined using an internal clock or other clock device. The work start time may be the time of acquiring the ID of the workpiece 44, may be the time of turning on the power of the display device 48, or may be the time of the worker 46 inputting the start of work at the display device 48. The work end time may be the time of acquiring an image of a stamp of work end given to the workpiece 44, may be the time of turning off the power of the display device 48, or may be the time of the worker 46 inputting the work end to the display device 48. Sometimes a relation is found between the work time and work results or the need for work support etc.

The "work date and time information" is defined as information which shows the date, time, and day when a worker 46 performed a unit work operation. For example, the work date and time information may be the time of work start, may be the time of work end, or may be a date and time between the date and time of work start and the date and time of work end. The work date and time information is, for example, determined using a camera or bar code reader or other feature recognition device. Alternatively, the work date and time information is determined using an internal clock or other clock device. Sometimes a relation is found between the work date and time and work results or the need for work support etc. such as the accuracy of the work being impaired if the working hours or working days etc. becomes a predetermined value or more.

The label data D2 is, for example, determined using a camera or bar code reader or other feature recognition device. In this case, the label data D2 can, for example, be determined based on an ID or image etc. of the workpiece 44. For example, in the case of assembly work for assembling a plurality of parts together, IDs of individual parts or an image of the assembled workpiece 44 may be compared against reference data stored in advance so as to determine the label data D2. If using image data, as the reference data, an image of either normal work or abnormal work may be used. What kind of unit work operation is normal is for example determined by a rule of thumb of the designer of the machine learning apparatus 10 etc.

Next, one example of operations of the threshold value calculating part 36 and learning model generating part 38 will be explained. The following formula 2 is one example of a function modeling the relationship of the abnormal work flag F and the status data D1. The abnormal work flag F shows if the actions of unit work operations corresponding to the status data D1 are susceptible to abnormality:

$$F = G \cdot g0 + H \cdot h0 + I \cdot i0 + J \cdot j0 \qquad \text{[Formula 2]}$$

In Formula 2, G, H, I, and J respectively represent content information, worker information, work time information, and work date and time information. g0, h0, i0, and j0 respectively represent the weight of the content information, the weight of the worker information, the weight of the work time information, and the weight of the work date and time information. The initial values of these weights can be found by regression analysis etc. after status data D1 is stored to a certain extent.

The following Formula 3 is one example of a function for modeling the relationship of the weights l1, l2 of the label data D2 and the weights g0, h0, i0, j0 of the status data D1:

$$g1=g0\cdot l1, h1=h0\cdot l1, i1=i0\cdot l1, j1=j0\cdot l1$$

$$g2=g0\cdot l2, h2=h0\cdot l2, i2=i0\cdot l2, j2=j0\cdot l2 \qquad \text{[Formula 3]}$$

In Formula 3, the weight l1 represents the weight of the normal work label data L1 in the label data D2, while the weight l2 represents the weight of the abnormal work label data L2 in the label data D2. g1, h1, i1, and j1 respectively represent the weights of the status data D1 at the time of acquisition of L1, and g2, h2, i2, and j2 respectively represent the weights of the status data D1 at the time of acquisition L2.

The following Formula 4 is a function for modeling the relationship between the abnormal work flag F and threshold value T at the time of acquisition of L1 and the time of acquisition of L2:

At time of acquisition of $L1$:

$$T=T'+(G\cdot g1+H\cdot h1+I\cdot i1+J\cdot j1)$$

At time of acquisition of $L2$:

$$T=T'-(G\cdot g2+H\cdot h2+I\cdot i2+J\cdot j2) \qquad \text{[Formula 4]}$$

In Formula 4, T' is the threshold value when acquiring the label data D2 the previous time. The initial value of T' may be zero. As shown in Formula 4, at the time of acquisition of L1, the threshold value T is increased, while at the time of acquisition of L2, the threshold value T is decreased. In this way, each time the data acquiring part 34 acquires the status data D1 and label data D2, the threshold value T is updated. In this way, the threshold value calculating part 36 calculates the threshold value T, while the learning model generating part 38 generates a similar work learning model M showing the correlation between the status data D1 and the threshold value T.

The following Formula 5 is a function for judging if the actions of a unit work operation corresponding to the status data D1 can easily become abnormal when performing processing for display of work support performed on-site using learning results of the machine learning apparatus 10 (learning model of work process).

When $F \geq T$: display normal work information before work

When $F < T$: do not display normal work information before work [Formula 5]

As shown in Formula 5, when the abnormal work flag F is the threshold value T or more, a unit work operation is susceptible to abnormality, so "normal work information" is displayed at the display part 54 before the worker 46 performs the unit work operation. On the other hand, when the abnormal work flag F is less than the threshold value T, a unit work operation is resistant to abnormality, so "normal work information" is displayed at the display part 54 only when the unit work operation which the worker 46 actually performs was not normal.

Figure 7:
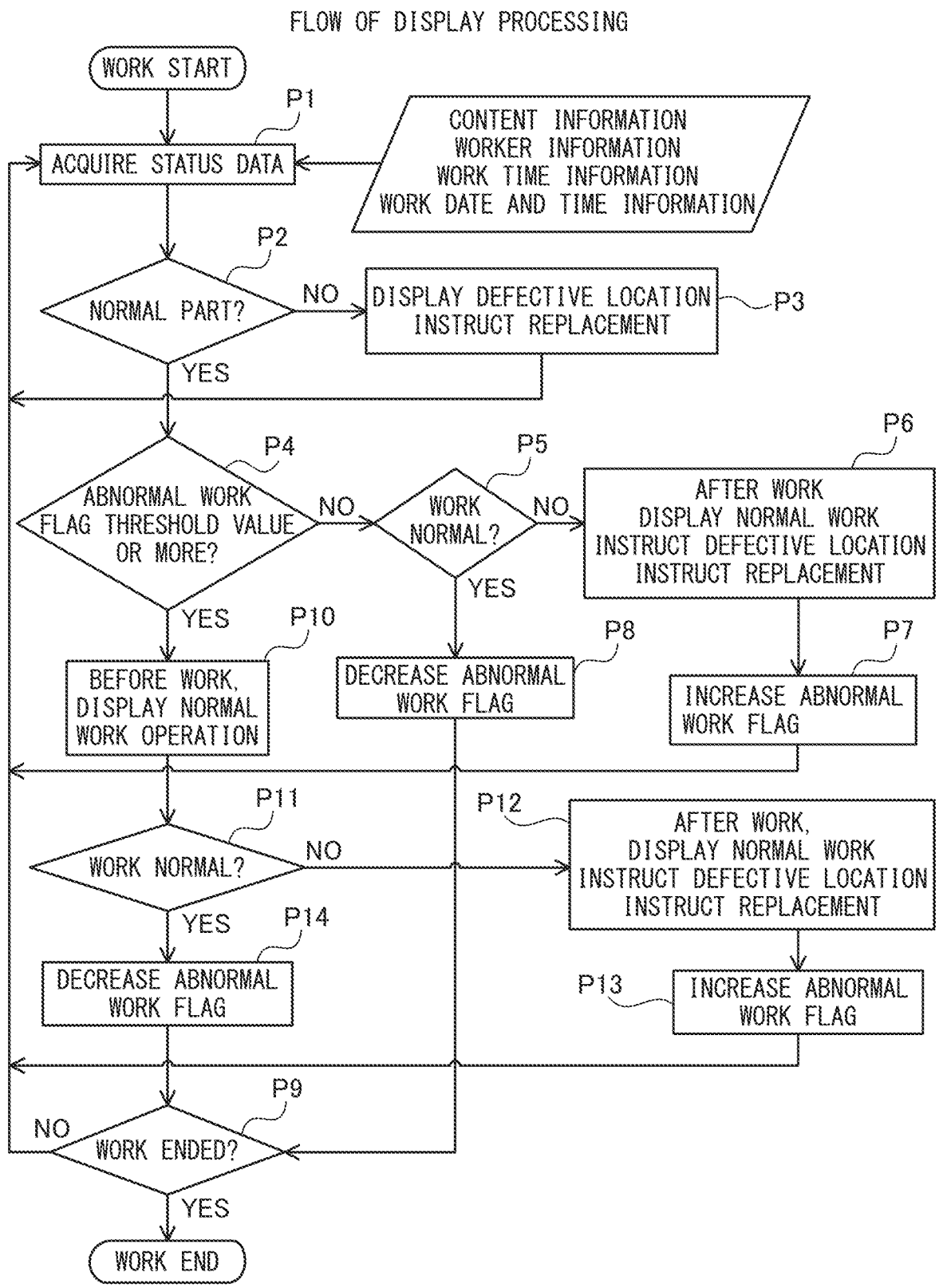
FIG. 7 is a flow chart showing one example of display processing in the display system of FIG. 6.

FIG. 7 shows one example of the flow of processing for display for work support performed on-site using learning results (learning model of work process) of the machine learning apparatus 10 in the display system 40 provided with the machine learning apparatus 10. First, at step P1, the data acquiring part 34 acquires the status data D1. In the illustrated example, the status data D1 includes worker information, work time information, and work date and time information in addition to the content information.

Next, at step P2, for example the second processor 50 judges if the workpiece 44 is normal. Whether the workpiece 44 is normal can be determined by image recognition etc. For example, in the case of assembly work for assembling a plurality of parts, whether the parts are normal can be determined by comparing images of the individual parts against reference data. When the workpiece 44 is not normal (when judgment at step P2 is NO), at step P3, the display controller 52 displays the defective location at the display part 54, instructs replacement of the workpiece 44, then returns to step P1. When the workpiece 44 is normal (when judgment at step P2 is YES), the controller proceeds to step P4.

At step P4, for example, the second processor 50 judges if the actions in the unit work operation corresponding to the acquired status data D1 are susceptible to abnormality, that is, if the abnormal work flag F (Formula 2) is the threshold value T or more (Formula 5). If the unit work operation is resistant to abnormality (when judgment at step P4 is NO), the worker 46 performs the unit work operation, then for example the second processor 50 judges at step P5 if the actions in the unit work operation were normal.

When the actions in the unit work operation were not normal (when judgment at step P5 is NO), at step P6, the display controller 52 displays the normal work information at the display part 54 and displays a defective location and, in accordance with need, instructs replacement of the workpiece 44. Due to such processing, for example, a skilled worker 46 can confirm the normal work information only when actually performing mistaken work etc. Next, for example, at step P7, the second processor 50 increases the abnormal work flag F and returns to step P1.

When the actions in the unit work operation were normal (when judgment at step P5 is YES), for example, at step P8, the second processor 50 decreases the abnormal work flag F and, at step P9, judges if the unit work operation has ended. When proceeding with learning during the processing for display of work support on-site, at steps P7 and P8, the threshold value T is updated (Formula 4).

If the actions in the unit work operation corresponding to the acquired status data D1 are susceptible to abnormality (when judgment at step P4 is YES), at step P10, the display controller 52 displays the normal work information at the display part 54 before the worker 46 performs the unit work operation. Due to this, even when the status data D1 shows the property of the worker 46 being unskilled, the work content being complicated, the work time being long, or the working hours or working days of the worker 46 being long, mistaken work or process defects can be prevented in advance.

After the worker 46 performs the unit work operation with the aid of the display of work support, for example, at step P11, the second processor 50 judges if the actions in the unit work operation were normal. If the actions in the unit work operation were not normal (when judgment at step P11 is NO), at step P12, the display controller 52 again displays the normal work information at the display part 54, displays a defective location, and instructs replacement of the workpiece 44 in accordance with need. Due to such processing, if the unit work operation was abnormal regardless of having displayed the normal work information before the work, the frequency of mistaken work or process defects can be reduced. Next, for example, the second processor 50 increases the abnormal work flag F at step P13 and returns to step P1.

If the actions of unit work operation are normal (when judgment at step P11 is YES), for example, the second processor 50 reduces the abnormal work flag F at step P14 and judges if the unit work operation has ended at step P9. If proceeding with learning during the processing for display of work support on-site, the threshold value T is updated at steps P13 and P14 (Formula 4).

If the unit work operation has not ended (when judgment at step P9 is NO), step P1 is returned to. If the unit work operation has ended (when judgment at step P9 is YES), the flow of display processing is ended as the end of work.

The machine learning apparatus and machine learning method of the present disclosure are not limited to the configurations of the above and illustrated embodiments. For example, the work processes and features of the unit work operations (that is, input data) covered by the machine learning are not limited to the above and illustrated embodiments. It is possible to use various features corresponding to demands of the users as input data. Further, the machine learning algorithms are not limited to the above and the illustrated embodiment. Various algorithms corresponding to demands of the users can be employed. As an application of the machine learning apparatus, in addition to the above-mentioned display system, for example, a system newly setting or changing matter described in the process manual in accordance with the learning model of the work process which the machine learning apparatus generates may be illustrated.

According to the machine learning method according to one aspect, learning relating to a plurality of different work processes is performed by generating a common similar work learning model for similar unit work operations among the unit work operations included in the individual work processes, so compared with a configuration individually performing learning for a plurality of work processes (alternatively the plurality of unit work operations), the number of data (that is, the number of learning operations) increases and the precision and certainty of learning relating to the individual work processes are improved. For example, not only is it possible to link features of the work process (work content, worker, work time, work date and time, etc.) with conditions required for work support or quality control (condition for teaching work procedure, condition for analyzing causes of process defects, etc.) so as to quickly and accurately establish a learning model, it is also possible to improve the reliability of the learning model, so it becomes possible to newly set, correct, change, etc. the condition required for work support or quality control at a high efficiency and high precision.

According to the machine learning apparatus according to the other aspect, an effect similar to the above effect according to the machine learning method rises.

The invention claimed is:

1. A machine learning method for performing learning relating to a plurality of different work processes respectively including at least single types of unit work operations, the machine learning method comprising:
   totaling up all of the unit work operations included in the plurality of different work processes so as to assess a presence of a plurality of unit work operations of the same type of the unit work operations;
   judging whether the plurality of unit work operations of the same type are similar to each other, wherein the judging includes
      calculating a number of work elements common among the plurality of unit work operations of the same type among the work elements of the plurality of unit work operations,
      calculating a degree of similarity from the number of work elements common among the plurality of unit work operations of the same type, and
      determining whether the degree of similarity is a predetermined value or more;

defining a first unit work operation and a second unit work operation that are similar to each other as a set of similar work operations and using a common machine learning algorithm so as to generate a similar work learning model using features of the set of similar work operations as input data; and performing learning relating to a first work process including the first unit work operation and a second work process including the second unit work operation based on the similar work learning model, wherein the common machine learning algorithm includes causing a processor to perform acquiring, as a learning data set, status data of data including content information of the unit work operations and showing the features and label data showing whether actions of the unit work operations corresponding to the status data are abnormal, calculating a threshold value for judging whether the actions of the unit work operations are susceptible to abnormality based on the learning data set, in response to an action of the actions of the unit work operations being susceptible to abnormality, causing a display to display normal work information before the action is performed, in response to the action being abnormal after causing the display to display the normal work information, instructing, through the display, to correct the action being abnormal, and generating the similar work learning model showing correlation between the content information and the threshold value using the learning data set.

2. The machine learning method according to claim 1, further comprising assessing the presence of the plurality of unit work operations of the same type by classifying said all of the unit work operations included in the plurality of different work processes into individual types so as to define a plurality of work types and judging the presence of any work type including the plurality of unit work operations.

3. The machine learning method according to claim 1, further comprising individually applying machine learning algorithms to further unit work operations of the unit work operations not similar to other unit work operations of the unit work operations and generating a dissimilar work learning model using not similar features of the further unit work operations as the input data, and performing the learning relating to the plurality of different work processes based on the similar work learning model and the dissimilar work learning model.

4. The machine learning method according to claim 1, further comprising, in response to none of the plurality of unit work operations of the same type being similar to each other, individually applying machine learning algorithms to the plurality of different work processes and generating a learning model having features of individual work processes as the input data.

5. The machine learning method according to claim 1, further comprising, in response to said all of the unit work operations included in the plurality of different work processes being of different types from each other, individually applying machine learning algorithms to the plurality of different work processes and generating a learning model having features of individual work processes as the input data.

6. The machine learning method according to claim 1, wherein the status data includes at least one additional information among worker information, work time information, and work date and time information of the unit work operations, and the similar work learning model shows correlation between the content information and the additional information with the threshold value.

7. A machine learning apparatus for performing learning relating to a plurality of different work processes respectively including at least single types of unit work operations, the machine learning apparatus comprising:

a work totaling part configured to total up all of the unit work operations included in the plurality of different work processes so as to assess a presence of a plurality of unit work operations of the same type of the unit work operations;

a similarity judging part configured to judge whether the plurality of unit work operations of the same type are similar to each other, wherein the similarity judging part is configured to calculate a number of work elements common among the plurality of unit work operations of the same type among the work elements of the plurality of unit work operations, calculate a degree of similarity from the number of work elements common among the plurality of unit work operations of the same type, and determine whether the degree of similarity is a predetermined value or more;

a first learning part configured to define a first unit work operation and a second unit work operation that are similar to each other as a set of similar work operations, and use a common machine learning algorithm so as to generate a similar work learning model using features of the set of similar work operations as input data; and a second learning part configured to perform learning relating to a first work process including the first unit work operation and a second work process including the second unit work operation based on the similar work learning model, wherein the first learning part is configured to acquire, as a learning data set, status data of data including content information of the unit work operations and showing the features and label data showing whether actions of the unit work operations corresponding to the status data are abnormal, calculate a threshold value for judging whether the actions of the unit work operations are susceptible to abnormality based on the learning data set, in response to an action of the actions of the unit work operations being susceptible to abnormality, cause a display to display normal work information before the action is performed, in response to the action being abnormal after causing the display to display the normal work information, instruct, through the display, to correct the action being abnormal, and generate the similar work learning model showing correlation between the content information and the threshold value using the learning data set.

8. The machine learning apparatus according to claim 7, wherein the work totaling part is configured to assess the presence of the plurality of unit work operations of the same type by classifying said all of the unit work operations included in the plurality of different work processes into different types so as to define a plurality of work types, and judging the presence of any work type including the plurality of unit work operations.

9. The machine learning apparatus according to claim 7, wherein
the first learning part is configured to individually apply machine learning algorithms to further unit work operations of the unit work operations not similar to other unit work operations of the unit work operations and generating a dissimilar work learning model using not similar features of the further unit work operations as the input data and
the second learning part is configured to perform the learning relating to the plurality of different work processes based on the similar work learning model and the dissimilar work learning model.

10. The machine learning apparatus according to claim 7, wherein the first learning part includes
a data acquiring part configured to acquire, as the learning data set, the status data of data including the content information of unit work operations and showing the features and the label data showing whether the actions of the unit work operations corresponding to the status data are abnormal,
a threshold value calculating part configured to calculate the threshold value for judging whether the actions of unit work operations are susceptible to abnormality based on the learning data set, and
a learning model generating part configured to generate the similar work learning model showing correlation between the content information and the threshold value using the learning data set.

11. The machine learning apparatus according to claim 10, wherein
the status data further includes at least one additional information among worker information, work time information, and work date and time information of the unit work operations, and
the similar work learning model shows correlation between the content information and the additional information with the threshold value.

12. A machine learning apparatus for performing learning relating to a plurality of different work processes respectively including at least single types of unit work operations, the machine learning apparatus comprising:
a processor configured to
total up all of the unit work operations included in the plurality of different work processes so as to assess a presence of a plurality of unit work operations of the same type of the unit work operations;
judge whether the plurality of unit work operations of the same type are similar to each other, wherein the judge includes
calculating a number of work elements common among the plurality of unit work operations of the same type among the work elements of the plurality of unit work operations,
calculating a degree of similarity from the number of work elements common among the plurality of unit work operations of the same type, and
determining whether the degree of similarity is a predetermined value or more;
define a first unit work operation and a second unit work operation that are similar to each other as a set of similar work operations;
use a common machine learning algorithm so as to generate a similar work learning model using features of the set of similar work operations as input data; and
perform learning relating to a first work process including the first unit work operation and a second work process including the second unit work operation based on the similar work learning model, wherein
the processor is configured to
acquire, as a learning data set, status data of data including content information of the unit work operations and showing the features and label data showing whether actions of the unit work operations corresponding to the status data are abnormal,
calculate a threshold value for judging whether the actions of the unit work operations are susceptible to abnormality based on the learning data set,
in response to an action of the actions of the unit work operations being susceptible to abnormality, cause a display to display normal work information before the action is performed,
in response to the action being abnormal after causing the display to display the normal work information, instruct, through the display, to correct the action being abnormal, and
generate the similar work learning model showing correlation between the content information and the threshold value using the learning data set.

* * * * *